United States Patent [19]

Avny

[11] Patent Number: 4,842,109
[45] Date of Patent: Jun. 27, 1989

[54] BIDIRECTIONAL DRIVE WITH A UNIDIRECTIONAL IRREVERSIBILITY MECHANISM

[75] Inventor: Eli Avny, Rockford, Ill.

[73] Assignee: Sundstrand Corp., Rockford, Ill.

[21] Appl. No.: 136,863

[22] Filed: Dec. 22, 1987

[51] Int. Cl.$^4$ .............................................. F16D 67/02
[52] U.S. Cl. .................................. 192/8 R; 192/8 A; 188/82.77
[58] Field of Search ............... 192/8 R, 8 A; 188/82.3, 188/82.34, 82.4, 82.77

[56] References Cited

U.S. PATENT DOCUMENTS

| | | | |
|---|---|---|---|
| 1,572,265 | 2/1926 | Bostwick et al. | 192/8 R |
| 2,166,792 | 7/1939 | Black | 188/82.4 |
| 2,339,232 | 1/1944 | Moroney | 192/8 R |
| 2,727,604 | 12/1955 | Robertson | 192/7 |
| 2,750,007 | 6/1956 | Turner et al. | 188/82.77 |
| 3,915,022 | 10/1975 | Walton | 74/99 R |
| 3,976,172 | 8/1976 | F'Geppert | 192/8 R |
| 3,976,173 | 8/1976 | Spencer | 192/8 R |
| 4,057,220 | 11/1977 | Kudlacek | 254/186 HC |
| 4,456,227 | 6/1984 | Notenboom | 254/350 |
| 4,480,733 | 11/1984 | Grimm et al. | 192/8 R |
| 4,591,029 | 5/1986 | Da Foe | 188/134 |

Primary Examiner—Rodney H. Bonck
Assistant Examiner—David A. Testardi
Attorney, Agent, or Firm—Antonelli, Terry & Wands

[57] ABSTRACT

A bidirectional drive has a unidirectional irreversibility mechanism (22) which includes a ratchet and pawl composed of a fixed outer annular gear (32) surrounding parallel plates (26, 30) attached to the input and output shafts (24,28). The pawl lever (36) is pivotably mounted on the output shaft plate (26) and driven in one direction by a pin (50) on the input shaft plate (26) against the force of a spring (44). Engaging protrusions (54) on each shaft plate (26, 30) are utilized when rotation is in the opposite direction.

16 Claims, 2 Drawing Sheets

BIDIRECTIONAL DRIVE WITH A UNIDIRECTIONAL IRREVERSIBILITY MECHANISM

TECHNICAL FIELD

The present invention relates to a drive arrangement that is bidirectionally rotatable in response to torque applied to an input shaft and which has a unidirectionally rotatable irreversibility mechanism in response to torque applied to an output shaft.

BACKGROUND ART

Winch systems consisting of two drums, a geared rotary actuator, an electric motor and an overtravel stop device are known. In such systems, a unidirectional rotational load is applied to the winch output through cables which are attached to the drums to which a force is applied such as that when a load is being lifted by the winch. It is required that the system will be irreversible in the direction of the applied load. Even though an included gear train is of a self-locking type, irreversibility in a vibration environment is not reliably provided.

DISCLOSURE OF INVENTION

An object of the present invention is to provide the required function of irreversibility to systems of this prior type.

Another object is to provide a novel unidirectional irreversibility mechanism of general applicability.

A further object is to provide a novel arrangement of force transmitting components, one group of components being used for transmitting shaft rotation in a first direction and another group of components being used for transmitting shaft rotation in the opposite direction.

A still further object resides in providing an input bidirectional drive which has a novel unidirectional irreversibility mechanism that includes a pawl and ratchet structure that has a fixed annular member with internal teeth surrounding force transmitting plates that have facing surfaces with pins and protrusions.

These and other objects of the invention will become more fully apparent from the claims and from the specification when read in conjunction with the drawings wherein:

BEST MODE FOR CARRYING OUT THE INVENTION

Figure 1:
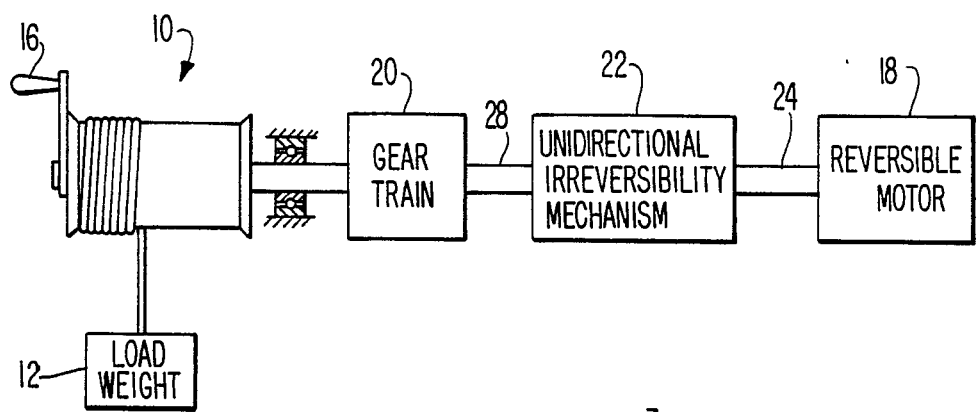
FIG. 1 illustrates a system of a general type in which the present invention may be used.

In a bidirectional winch which typically may include a drum 10 with a load weight 12, the shaft 14 is journaled for rotation in either direction of rotation. Important to understanding the disclosure is the fact that the direction of shaft rotation which lowers the weight 12 is referred to herein as being a forward direction and clockwise as viewed from the right hand side of drum 10 and in FIGS. 1, 2 and 5. Clockwise shaft rotation controls the downward displacement of load weight 12 which is of concern and to be carefully monitored. Conventionally, the drum 10 may be rotated by a secondary source such as handle 16 or a gear provided by an auxiliary power train, not shown, or by motor 18 in a reverse direction for raising the load weight 12 or its equivalent.

Driving force in either a forward or reverse direction applied to shaft 14, is conventionally supplied by a suitable motor 18 and gear train 20. The present invention involves a novel drive mechanism 22 that is irreversible in the forward drive direction of the applied load 12.

Figure 2:
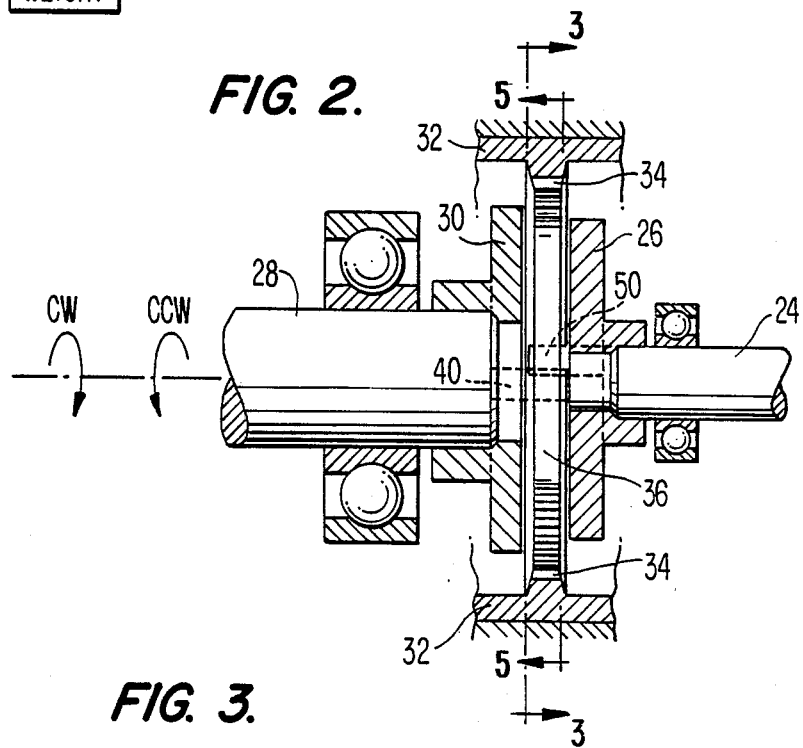
FIG. 2 is a diagrammatic view of the drive of the present invention.

Referring now to FIG. 2, the input shaft 24 is formed to receive a plate 26 on an end portion thereof. Output shaft 28 is formed to receive a plate 30 on an end portion thereof.

Surrounding the space between the facing surfaces of plates 26 and 30 is an annular member 32 that is fixed relative to the supports of the input and output shafts 24, 28 respectively. Annular member 32 has teeth 34 which extend around its entire inner periphery and serve as a part of a ratchet and pawl mechanism.

Figure 3:
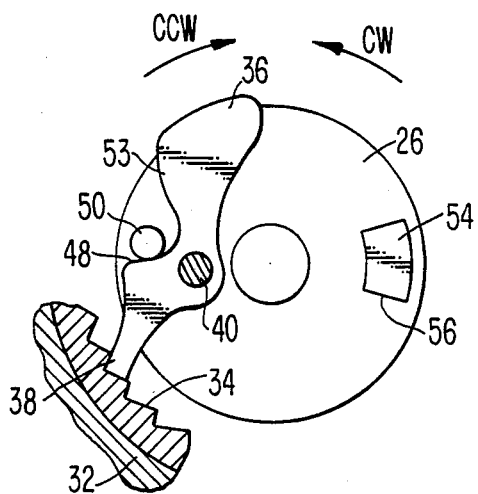
FIG. 3 is a side elevation in section taken along line 3—3 of FIG. 2.
Figure 5:
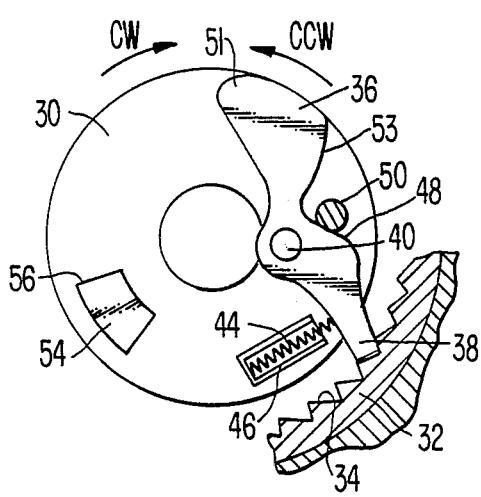
FIG. 5, is a side elevation in section taken along line 5—5 of FIG. 2.

A lever or pawl 36, shown also in FIGS. 3 and 5, is mounted in the space between facing surfaces of the input shaft plate 26 and the output shaft plate 30. The free end 38 of lever 36 is arranged to engage the teeth 34 on annular member 32 as illustrated in FIGS. 3 and 5.

Figure 6:
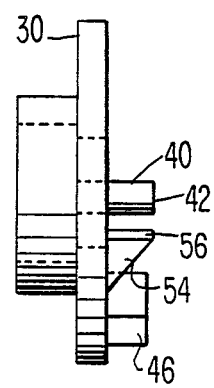
FIG. 6 is an end view looking at the right side of the output shaft plate shown in FIG. 5.
Figure 7:
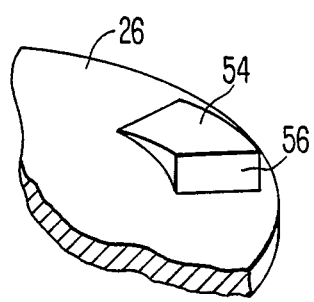
FIG. 7 is a partial view showing the profile of a protrusion carried by the input shaft plate.
Figure 8:
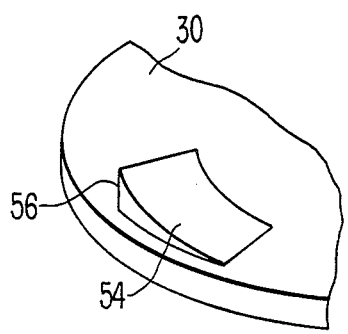
FIG. 8 is a partial view showng the profile of a corresponding protrusion carried by the output shaft plate.

Lever 36 is mounted for a rocking or pivotal movement on a pin 40. Pin 40 is secured to the plate 30 of output shaft 28 in a cantilever fashion (See FIG. 6) so that the end 42 of pin 40 does not engage the plate 26 attached to the input shaft 24. The free end 38 of lever 36 is biased by a suitable spring 44, here illustrated as a helix that is under compression, to be normally in engagement with one of the teeth 34 of the annular member 32. A guide or housing 46 for spring 44 is rigidly secured to the plate 30 of the output shaft to serve as a stop or abutment to limit the pivotal movement of lever 36 in a clockwise direction as viewed in FIG. 5 and to maintain one end of spring 44 in a fixed position.

Lever 36 may be also formed to have recess between surfaces 48 and 53. The mass at end 51 of lever 36 is oriented eccentrically so that during high speed operation, a centrifugal force is provided on lever 36 which causes the free end to move in opposition to the force of spring 44 away from engagement with the teeth 34 of annular member 32. Surface 48 of lever 36 is shown in FIGS. 3 and 5 to be in engagement with a pin 50.

Pin 50 may be cantilever mounted in plate 26 that is associated with the input shaft 24 and may have an end 52 which does not engage plate 30 that is associated with the output shaft 28.

As is illustrated in FIGS. 3 and 5 the axis of rotation of the aligned input and output shafts 24 and 28 respectively is nearer to the output shaft pin 40 about which lever 36 rocks than to input shaft pin 50. Both pins 40 and 50 are nearer to the axis of rotation than is the abutment surface of spring guide 46.

The driving force in the clockwise or forward direction of rotation of the input shaft 24 that is transmitted by pin 50 to the output shaft 28, is applied to a mid-portion of lever 36 that is between the location of pin 40 and spring guide 46 which are both secured to the plate 30 that is associated with the output shaft 28.

Referring now to FIGS. 3 through 8, the plates 26 and 30 that are associated with the input and output shafts are formed with protrusions 54 which may be identical in construction. Each protrusion 54 has a surface 56 that is adapted to engage or abut the corresponding surface 56 on the other protrusion. Each of the protrusions 54 thus extends across the space between the facing surfaces of the plates 26 and 30 and both are located at positions that are generally diametrically opposite from the locations of the pins 40 and 50 and out of the path of movement of the lever or pawl 36.

When the system is at rest the free end portion 38 of the pawl or lever 36 is in engagement with tooth portion 34 of the annular member 32 as illustrated in FIGS. 3 and 5.

OPERATION

When the motor 18 causes input shaft 24 to be rotated in a forward direction to lower the load (i.e., rotates the shafts clockwise as viewed in FIGS. 1, 2 and 4 and as labeled in FIG. 3) a force is applied to pin 50 which causes the lever 36 to pivot about pin 40 until the lever 36 engages the spring guide 46 that is secured to the output shaft plate 30. The free end 38 of the lever 36 is moved out of engagement with the teeth 34. Further rotation of the motor input shaft 24 causes the drum to rotate and lower the load 12 or to drive a rigid member in an application which does not use a winch.

Figure 4:
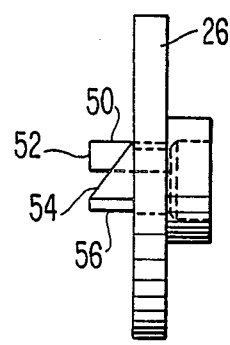
FIG. 4 is an end view looking at the left side of the input shaft plate shown in FIG. 3.

When the motor 18 causes input shaft 24 to be rotated counterclockwise to raise the load (i.e., rotates the shafts 24 and 28 counterclockwise as viewed in FIGS. 1, 2 and 4 and as labeled in FIG. 3) the protrusion 54 on the input shaft plate 26 rotates downwardly as illustrated in FIG. 3 and engages the similarly shaped protrusion 54 of the output shaft plate 30 thereby providing a positive drive force to the output shaft in a counterclockwise direction. Further rotation of the input motor driven shaft 24 causes pawl lever 36 to slide off the teeth 34. Due to enlarged size of the pawl or lever 36 at the end opposite the free end 38, rotation at high speed will generate a centrifugal force that operates in opposition to the force produced by spring 44 thereby reducing noise and wear; where rotational speed is sufficiently high, free end 38 of lever 36 will be free from teeth 34.

When the motor 18 is disabled, counterclockwise rotation of the output shaft 28 and plate 30 to raise the load weight 12 will be permitted and will pass through the mechanism to drive input shaft plate 26. As is evident from FIG. 5, counterclockwise rotation of pin 40 causes the lever 36 to slide off the teeth 34. the load weight 12 will be permitted and will pass through the mechanism to drive input shaft plate 26. As is evident from FIG. 5, counterclockwise rotation of pin 40 causes the lever 36 to slide off the teeth 34. Further rotation of the output plate shaft 30 will cause the abutment surfaces 56 of protrusions 54 to abut and thereafter to cause rotation of the motor input shaft 24.

However, when the motor 18 is disabled and the load or other external force applied to the output shaft 28 tends to rotate the shafts in a clockwise direction as when the system is in a rest condition, the free end 38 of the lever 36 will jam against the ratchet teeth 34 of the annular member 32 and prohibit this motion.

While only a single embodiment of the present invention has been shown and described, it is apparent that changes by reversal of parts and use of equivalent structural components may be used to achieve the benefits and unique advantages of the present invention. Accordingly, all changes and modifications which fall within the scope of the claims are intended to be covered thereby.

I claim:

1. A bidirectional drive with a unidirectional irreversibility mechanism comprising:
   a pair of plates mounted in parallel facing relationship on facing ends of aligned input and output shafts;
   a ratchet and pawl assembly having an annular member fixed relative to said shafts at a position surrounding said plates and a lever mounted for pivotal movement on the output shaft plate to be between said plates, said lever having free end spring biased to engage teeth on said annular member;
   a first means on said input shaft for engaging said lever along a mid-portion to move the lever free end against the bias of the spring to abut a stop member on the output shaft plate to drive said output shaft in a forward drive direction, and upon removal of drive power from the input shaft, the free end of said lever being spring biased into engagement with said annular member teeth thereby to prevent shaft rotation due to the load tending to continue causing rotation of the output shaft in the forward drive direction; and
   a second means separate from said first means, alternately responsive to rotation of either the input shaft or the output shaft in a direction opposite the forward drive direction to provide a drive force in said opposite direction to the other of said shafts while dragging the free end of the lever along the annular member teeth.

2. The drive as defined in claim 1, wherein said second means to provide a drive force in a direction opposite the forward drive direction includes a pair of protrusions, one on each of said plates with said protrusions having facing surfaces that abut when the input shaft is driven in said opposite direction.

3. A bidirectional drive with a unidirectional irreversibility mechanism comprising:
   a pair of plates mounted in parallel facing relationship on facing ends of aligned input and output shafts;
   a ratchet and pawl assembly having an annular member fixed relative to said shafts at a position surrounding said plates and a lever mounted for pivotal movement on the output shaft plate to be between said plates, said lever having a free end spring biased to engage teeth on said annular member;
   means on said input shaft for engaging said lever along a mid-portion to move the lever free end against the bias of the spring to abut a stop member on the output shaft plate to drive said output shaft in a forward drive direction, and upon removal of drive power from the input shaft, the free end of said lever being spring biased into engagement with said annular member teeth thereby to prevent shaft rotation due to the load tending to continue causing rotation of the output in the forward drive direction;
   means, responsive to rotation of one of the input and output shafts in a direction opposite the forward drive direction to provide a drive force in said opposite direction to the other of said shafts while dragging the free end of the lever along the annular member teeth, and including a pair of protrusions, one on each of said plates with said protrusions having facing surfaces that abut when the input shaft is driven in said opposite direction; and means for rotating the output shaft in a direction opposite to said forward direction and for transmitting such rotation to the input shaft through means including the facing surfaces of said protrusions.

4. A bidirectional drive with a unidirectional irreversibility mechanism comprising:

a pair of plates mounted in parallel facing relationship on facing ends of aligned input and output shafts;

a ratchet and pawl assembly having an annular member fixed relative to said shafts at a position surrounding said plates and a lever mounted for pivotal movement on the output shaft plate to be between said plates, said lever having a free end spring biased to engage teeth on said annular member;

means on said input shaft for engaging said lever along a mid-portion to move the lever free end against the bias of the spring to abut a stop member on the output shaft plate to drive said output shaft in a forward drive direction, and upon removal of drive power from the input shaft, the free end of said lever being spring biased into engagement with said annular member teeth thereby to prevent shaft rotation due to the load tending to continue causing rotation of the output shaft in the forward drive direction;

means, responsive to rotation of one of the input and output shafts in a direction opposite the forward drive direction to provide a drive force in said opposite direction to the other of said shafts while dragging the free end of the lever along the annular member teeth; and said lever containing a mass at an end opposite said free end so that rotation of the mass produces a centrifugal force that acts in opposition to the spring bias force and at a predetermined rotational speed causes the pawl to rotate free from the teeth.

5. In a bidirectional drive with unidirectional irreversibility, an input shaft mounted for bidirectional rotation about an axis;

a pin having a longitudinal axis that is disposed parallel to the input shaft axis, is displaced radially from said input shaft axis and is mounted to turn with said input shaft;

an output shaft mounted for bidirectional rotation about an axis that is in substantial alignment with the input shaft axis;

a pin having a longitudinal axis that is disposed parallel to the output shaft axis, is displaced radially from said output shaft axis and is mounted to turn with said output shaft;

a pawl and ratchet mechanism including a toothed annular member fixed against rotation relative to said shafts, said annular member being located to circumferentially envelop the paths of movement of both pins and concentrically positioned with respect to the input shaft axis;

a lever mounted for pivotal movement about the axis of the pin associated with the output shaft, said lever having a free end adapted to engage the teeth of the annular member and a surface which is adapted for engagement with the pin associated with the input shaft as the lever rocks about its axis of pivotal movement;

spring means having one end fixed to rotate with the output shaft and a free end urging said lever into engagement with the teeth of said annular member;

spring guide means associated with said spring means and mounted to rotate with said output shaft, said guide means being positioned to engage said lever and capable of transmitting a force causing concomitant rotation of the input and output shafts when the lever is free of engagement with the teeth of said annular member; and means independent of said pins and said lever alternately responsive to rotation of either the input shaft or the output shaft in a direction opposite the forward drive direction to provide a drive force in said opposite direction and cause dragging of the free end of the lever in a contacting relationship along the annular member teeth.

6. The drive as defined in claim 5, further having a plate having a central aperture fitting on the output shaft, wherein the spring means is in the form of a helix having one end fixed relative to said plate and wherein the pin associated with the output shaft and the guide means are both secured to said plate with the guide means being positioned radially outwardly from the output shaft axis by a distance that is greater than the distance of said pin from said axis.

7. The drive as defined in claim 6, wherein the pin associated with the input shaft is positioned radially outwardly of the pin associated with the output shaft and radially inwardly of the guide means to engage the lever at a mid-portion when the input shaft is driven in a forward direction.

8. In a bidirectional drive with unidirectional irreversibility, an input shaft mounted for bidirectional rotation about an axis;

a pin having a longitudinal axis that is disposed parallel to the input shaft axis, is displaced radially from said input shaft axis and is mounted to turn with said input shaft;

an output shaft mounted for bidirectional rotation about an axis that is in substantial alignment with the input shaft axis;

a pin having a longitudinal axis that is disposed parallel to the output shaft axis, is displaced radially from said output shaft axis and is mounted to turn with said output shaft;

a pawl and ratchet mechanism including a toothed annular member fixed against rotation relative to said shafts, said annular member being located to circumferentially envelop the paths of movement of both pins and concentrically positioned with respect to the input shaft axis;

a lever mounted for pivotal movement about the axis of the pin associated with the output shaft, said lever having a free end adapted to engage the teeth of the annular member and a surface which is adapted for engagement with the pin associated with the input shaft as the lever rocks about its axis of pivotal movement;

spring means having one end fixed to rotate with the output shaft and a free end urging said lever into engagement with the teeth of said annular member;

spring guide means associated with said spring means and mounted to rotate with said output shaft, said guide means being positioned to engage said lever and capable of transmitting a force causing concomitant rotation of the input and output shafts when the lever is free of engagement with the teeth of said annular member;

a first protrusion rigidly connected with the input shaft and separate from the input shaft pin, said protrusion having an abutment surface that is positioned radially from the input shaft axis and free of contact with said lever;

a second protrusion rigidly connected with the output shaft and separate from the output shaft pin, said protrusion having an abutment surface that is positioned radially from the output shaft axis and free of contact with said lever; and said abutment surfaces being positioned and aligned with respect to each other such that upon application of a force to the input shaft for driving the input shaft in a direction opposite the forward drive direction, the input shaft pin moves away from the lever surface with which the pin is in engagement when driving the input shaft in the forward drive direction and the output shaft is driven through a drive connection formed by engagement of said abutment surfaces with each other.

9. The drive as defined in claim 8, wherein the first protrusion is positioned to be generally diametrically opposite from the input shaft pin and the second protrusion is positioned to be generally diametrically opposite from the output shaft pin.

10. In a bidirectional drive with unidirectional irreversibility, an input shaft mounted for bidirectional rotation about an axis;

a pin having a longitudinal axis that is disposed parallel to the input shaft axis, is displaced radially from said axis and is mounted to turn with said input shaft;

an output shaft mounted for bidirectional rotation about an axis that is in substantial alignment with the input shaft axis;

a pin having a longitudinal axis that is disposed parallel to the output shaft axis, is displaced radially from said axis and is mounted to turn with said output shaft;

a pawl and ratchet mechanism including a toothed annular member fixed against rotation relative to said shafts, said annular member being located to circumferentially envelop the paths of movement of both pins and concentrically positioned with respect to the input shaft axis;

a lever mounted for pivotal movement about the axis of the pin associated with the output shaft, said lever having a free end adapted to engage the teeth of the annular member and a surface which is adapted for engagement with the pin associated with the input shaft as the lever rocks about its axis of pivotal movement;

spring means having one end fixed to rotate with the output shaft and a free end urging said lever into engagement with the teeth of said annular member;

spring guide means associated with said spring means and mounted to rotate with said output shaft, said guide means being positioned to engage said lever and capable of transmitting a force causing concomitant rotation of the input and output shafts when the lever is free of engagement with the teeth of said annular member; and said lever containing a mass at an end opposite said free end so that rotation of the mass produces a centrifugal force that acts in opposite to the spring bias force and at a predetermined rotational speed causes the pawl to rotate free from the teeth.

11. In a bidirectional drive with unidirectional irreversibility, a pawl and ratchet arrangement including a housing having an annular member with gear teeth surrounding a pawl mounted for pivotal movement about an axis of a pin attached to rotate with an output shaft, said pawl having a free end mounted for engagement with said gear teeth and a surface engagable by a pin attached to rotate with an input shaft;

means for normally biasing said pawl free end into engagement with said gear teeth to prevent rotation of the output shaft in a forward drive direction by reason of a load on the output shaft;

guide means associated with said biasing means, said guide means being mounted for rotation with said output shaft and engaged by said pawl when the input shaft is driven in its forward drive direction to supply a rotational force to said output shaft; and means independent of said guide means alternately responsive to rotation of either the input shaft or the output shaft in a direction opposite the forward drive direction to provide a drive force in said opposite direction and cause dragging of the free end of the lever in a contacting relationship along the annular member teeth.

12. The drive as defined in claim 11, further having a plate having a central aperture fitting on the output shaft, wherein the spring means is in the form of a helix having one end fixed with respect to said plate and wherein the pin associated with the output shaft and the guide means are both secured to said plate with the guide means being positioned radially from the output shaft, axis by a distance that is greater than the distance of said pin from said shaft axis.

13. The drive as defined in claim 12, wherein the pin associated with the input shaft is positioned radially outwardly of the pin associated with the output shaft and radially inwardly of the guide means to engage the lever at a mid-portion when the input shaft is driven in its forward direction.

14. In a bidirectional drive with unidirectional irreversibility, a pawl and ratchet arrangement including a housing having an annular member with gear teeth surrounding a pawl mounted for pivotal movement about an axis of a pin attached to rotate with an output shaft, said pawl having a free end mounted for engagement with said gear teeth and a surface engagable by a pin attached to rotate with an input shaft;

means for normally biasing said pawl free end into engagement with said gear teeth to prevent rotation of the output shaft in a forward drive direction by reason of a load on the output shaft;

guide means associated with said biasing means, said guide means being mounted for rotation with said output shaft and engaged by said pawl when the input shaft is driven in its forward drive direction to supply a rotational force to said output shaft;

a first protrusion rigidly connected with the input shaft and separate from the input shaft pin, said protrusion having an abutment surface that is positioned radially from the input shaft axis and free of contact with said pawl;

a second protrusion rigidly connected with the output shaft and separate from the output shaft pin, said protrusion having an abutment surface that is positioned radially from the output shaft axis and free of contact with said pawl; and said abutment surfaces being positioned and aligned with respect to each other such that upon application of a force to the input shaft for driving the input shaft in a direction opposite the forward drive, the input shaft pin moves away from the one of the pawl surfaces with which the pin is in engagement when driving the input shaft in the forward drive direction and the output shaft is driven through a drive connection formed by engagement of said abutment surfaces with each other.

15. The drive as defined in claim 14, wherein the first protrusion is positioned to be generally diametrically opposite from the input shaft pin and the second protrusion is positioned to be generally diametrically opposite from the output shaft pin.

16. In a bidirectional drive with unidirectional irreversibility, a pawl and ratchet arrangement including a housing having an annular member with gear teeth surrounding a pawl mounted for pivotal movement about an axis of a pin attached to rotate with an output shaft, said pawl having a free end mounted for engagement with said gear teeth and a surface engagable by a pin attached to rotate with an input shaft;

means for normally biasing two pawl free end into engagement with said gear teeth to prevent rotation of the output shaft in a forward drive direction by reason of a load on the output shaft;

guide means associated with said biasing means, said guide means being mounted for rotation with said output shaft and engaged by said pawl when the input shaft is driven in its forward drive direction to supply a rotational force to said output shaft; and said pawl containing a mass at an end opposite said free end so that rotation produces a centrifugal force that acts in opposition to the spring bias force of the spring biasing means and at a predetermined rotational speed causes the pawl to rotate free from the teeth.

* * * * *